United States Patent
Sakurazawa et al.

(10) Patent No.: US 7,370,027 B2
(45) Date of Patent: May 6, 2008

(54) SYSTEM FOR STOCKTAKING ASSET ARTICLES USING A MOBILE DEVICE

(75) Inventors: Shigeru Sakurazawa, Gunma (JP); Masahiro Ozawa, Gumna (JP); Naomi Kimura, Gunma (JP)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 10/349,311

(22) Filed: Jan. 23, 2003

(65) Prior Publication Data
US 2003/0182211 A1 Sep. 25, 2003

Related U.S. Application Data

(63) Continuation of application No. PCT/JP00/04985, filed on Jul. 26, 2000.

(51) Int. Cl.
G06F 7/00 (2006.01)
(52) U.S. Cl. .............................. 707/1; 707/10; 705/28; D14/420
(58) Field of Classification Search .................... 707/1, 707/10; 705/28; D14/420
See application file for complete search history.

(56) References Cited

U.S. PATENT DOCUMENTS

| | | | |
|---|---|---|---|
| 5,393,965 A * | 2/1995 | Bravman et al. | 235/383 |
| 5,646,389 A * | 7/1997 | Bravman et al. | 235/385 |
| 5,870,733 A * | 2/1999 | Bass et al. | 707/2 |
| 6,105,004 A * | 8/2000 | Halperin et al. | 705/28 |
| 6,182,053 B1 * | 1/2001 | Rauber et al. | 705/28 |
| 6,519,600 B1 * | 2/2003 | Siefert | 707/10 |
| 2001/0042059 A1* | 11/2001 | Uehara et al. | 707/1 |

FOREIGN PATENT DOCUMENTS

| | | |
|---|---|---|
| JP | 4-373070 | 12/1992 |
| JP | 6-11365 | 1/1994 |
| JP | 6-241953 | 9/1994 |
| JP | 7-311800 | 11/1995 |
| JP | 11-203349 | 7/1999 |
| JP | 2000-194751 | 7/2000 |

OTHER PUBLICATIONS

Anonymous, "New Readers Mobilize Technology", Automatic I.D. News, vol. 15, No. 9, p. 26, Aug. 1999/See International Search Report.

* cited by examiner

Primary Examiner—Wilson Lee
Assistant Examiner—Michael Le
(74) Attorney, Agent, or Firm—Kratz, Quintos & Hanson, LLP

(57) ABSTRACT

A stocktaking asset article system using a mobile terminal in which correct and rapid updates or new registrations of assets in an asset management master database may be accomplished. The mobile terminal has a specified database storing data necessary for the stocktaking, means for reading specific information from the asset article, means for retrieving information regarding the asset article from the specified database on the basis of the specific information, and inputting means for inputting information regarding an asset article recognized as not existing in the specified database. An assets management apparatus has means for extracting the data necessary for the stocktaking from the master database and registering the data as the specified database, and means for reflecting the information inputted from the inputting means upon the stocktaking on the master database.

9 Claims, 7 Drawing Sheets

FIG. 5(A)

| MANAGEMENT NUMBER | EQUIPMENT NAME | INSTALLATION POST | INSTALLATION PLACE | USE CONDITIONS | USER | STOCKTAKING CONDITIONS | STOCKTAKING DATE | PERSON IN CHARGE OF STOCKTAKING | NOTES |
|---|---|---|---|---|---|---|---|---|---|
| XXXXXXXX | PC | AA SECTION | B1 ROOM | IN USE | CC | SUBJECTED | 000630 | DE | |
| XXXXXXXY | PC | AA SECTION | B2 ROOM | IN NO USE | - | SUBJECTED | 000630 | DE | |
| XXXXXXYY | PC | AB SECTION | C1 ROOM | IN USE | FF | SUBJECTED | 000630 | DE | |

| MANAGEMENT NUMBER | EQUIPMENT NAME | INSTALLATION POST | INSTALLATION PLACE | USE CONDITIONS | USER | STOCKTAKING CONDITIONS | STOCKTAKING DATE | PERSON IN CHARGE OF STOCKTAKING | NOTES |
|---|---|---|---|---|---|---|---|---|---|
| XXXXXXXX | PC | AA SECTION | B1 ROOM | IN USE | CC | SUBJECTED | 001012 | DD | |
| XXXXXXXY | PC | AA SECTION | B1 ROOM | IN USE | EE | SUBJECTED | 001012 | DD | |
| XXXXXXYY | PC | AA SECTION | B1 ROOM | IN USE | GG | SUBJECTED | 001012 | DD | |
| XXXXXYYY | PC | AA SECTION | B1 ROOM | IN USE | HH | SUBJECTED | 001012 | DD | |

| MANAGEMENT NUMBER | EQUIPMENT NAME | INSTALLATION POST | INSTALLATION PLACE | USE CONDITIONS | USER | STOCKTAKING CONDITIONS | STOCKTAKING DATE | PERSON IN CHARGE OF STOCKTAKING | NOTES |
|---|---|---|---|---|---|---|---|---|---|
| XXXXXXXX | PC | AA SECTION | B1 ROOM | IN USE | CC | NOT SUBJECTED | - | - | |
| XXXXXXXY | PC | AA SECTION | B2 ROOM | IN NO USE | - | NOT SUBJECTED | - | - | |

| MANAGEMENT NUMBER | EQUIPMENT NAME | INSTALLATION POST | INSTALLATION PLACE | USE CONDITIONS | USER | STOCKTAKING CONDITIONS | STOCKTAKING DATE | PERSON IN CHARGE OF STOCKTAKING | NOTES |
|---|---|---|---|---|---|---|---|---|---|
| XXXXXXXX | PC | AA SECTION | B1 ROOM | IN USE | CC | SUBJECTED | 001012 | DD | |
| XXXXXXXY | PC | AA SECTION | B1 ROOM | IN USE | EE | SUBJECTED | 001012 | DD | |

| MANAGEMENT NUMBER | EQUIPMENT NAME | INSTALLATION POST | INSTALLATION PLACE | USE CONDITIONS | USER | STOCKTAKING CONDITIONS | STOCKTAKING DATE | PERSON IN CHARGE OF STOCKTAKING | NOTES |
|---|---|---|---|---|---|---|---|---|---|
| XXXXXYYY | PC | AB SECTION | C1 ROOM | IN USE | FF | SUBJECTED | 000630 | DE | |

| MANAGEMENT NUMBER | EQUIPMENT NAME | INSTALLATION POST | INSTALLATION PLACE | USE CONDITIONS | USER | STOCKTAKING CONDITIONS | STOCKTAKING DATE | PERSON IN CHARGE OF STOCKTAKING | NOTES |
|---|---|---|---|---|---|---|---|---|---|
| XXXXXYYY | PC | AA SECTION | B1 ROOM | IN USE | GG | SUBJECTED | 001012 | DD | |

| MANAGEMENT NUMBER | EQUIPMENT NAME | INSTALLATION POST | INSTALLATION PLACE | USE CONDITIONS | USER | STOCKTAKING CONDITIONS | STOCKTAKING DATE | PERSON IN CHARGE OF STOCKTAKING | NOTES |
|---|---|---|---|---|---|---|---|---|---|
| XXXXXYYY | PC | AA SECTION | B1 ROOM | IN USE | HH | SUBJECTED | 001012 | DD | |

223

SYSTEM FOR STOCKTAKING ASSET ARTICLES USING A MOBILE DEVICE

This application is a continuation of international application PCT/JP00/04985 filed Jul. 26, 2000.

TECHNICAL FIELD

The present invention relates to an assets management system for performing stocktaking to manage asset articles (articles such as fixed asset articles, lease articles, rental articles and idle asset articles) in an enterprise, and a terminal for assets management and an assets management apparatus used in the assets management system.

BACKGROUND ART

In an enterprise, it is generally necessary to manage articles (hereinafter may be referred to as "asset management articles" or merely "asset articles") such as fixed asset articles, lease articles, rental articles and idle asset articles used in the enterprise. Therefore, stocktaking is performed several times in a year.

In the stocktaking, conditions as to individual asset articles are identified to manage each asset article unlike stocktaking for stock management (management of the number of the commodities) performed in a warehouse which stores commodities or a store which sells commodities. For example, an installation post (installation floor), an installation place, a user, use conditions (in no use or in use), stocktaking conditions (whether stocktaking has been performed or not), a stocktaking date and the like are identified as to the individual asset articles. In the stocktaking, conditions as to individual asset articles are identified to manage each asset article unlike stocktaking for stock management (management of the number of the commodities) performed in a warehouse where stores commodities or a store where sells commodities. For example, an installation post (installation floor), an installation place, a user, use conditions (in no use or in use), stocktaking conditions (whether stocktaking has been performed or not), a stocktaking date and the like are identified as to the individual asset articles.

Asset management articles may be considered fixtures used in an enterprise. These fixtures include displays, key boards and mice used in personal computers. Further included in these fixtures are such items as software, printers, scanners, copying machines, facsimiles, telephones, desks, chairs and bookshelves.

The stocktaking has heretofore been performed by manual works. In this case, a ledger such as a list of fixed asset article has been prepared in advance, and checking of the ledger with all the fixed asset articles has been performed to conduct the stocktaking.

Since not only such manual works take time and labor, but also the stocktaking tends to be concentrated at a specific season in a year, for example, the end of the year, however, there is a strong demand for efficiently performing the stocktaking.

In addition, in stocktaking using a paper-based ledger, for example, difficulties are encountered on application to management and/or retrieval of idle asset articles, and so a range making good use of the ledger has been limited.

Further, in the stocktaking by the manual works, there is a high possibility that personal mistakes such as mistakes in checking and mistakes in entry/posting to the ledger may occur. More specifically, a worker who performs stocktaking visually identifies an asset article subjected to the stocktaking, also visually identifies an item (registration column) according to the asset article in the ledger and then enters information regarding the stocktaking in this time to the registration column by hand. Accordingly, there is a possibility that the worker may mistake an item (registration column) to enter the information by a mistake in checking, and there is also a possibility that the worker may mistake the information itself to be entered to the item (registration column) by a mistake in entry/posting.

There is thus proposed an assets management system constructed by communicably connecting a host PC (PC: personal computer; hereinafter may be referred to as host" merely) and a mobile computer (handy terminal) to each other. In this assets management system, the host serves as a center of the system and has an assets management master database (hereinafter may be referred to as master database" merely) storing assets management master data that are information regarding asset management articles. The mobile computer is a portable terminal (portable information processing apparatus) used upon working such as actual stocktaking.

When this assets management system is adopted, bar codes with management numbers characteristic of individual asset articles (asset management articles) to be managed encoded are stuck in advance on the asset articles, respectively, and stocktaking information (for example, stocktaking conditions and stocktaking date) regarding the asset articles is registered in advance as the assets management master data correspondingly to the management numbers of the individual asset articles in the assets management master database.

In such an assets management system, after data for stocktaking in the same form as the assets management master data are sent from the assets management master database of the host to the mobile computer and registered as a database for stocktaking, a stocktaking work is started. A bar code reader (scanner) is connected to the mobile computer, and the bar code stuck on each asset management article is read out by the bar code reader upon a stocktaking work to input the encoded management number into the mobile computer.

The inputted management number is retrieved from the database for stocktaking registered in the mobile computer to update the stocktaking information regarding the asset management article to which the management number has been attached. The contents of the database for stocktaking updated in such a manner are sent to the host after completion of the stocktaking work so as to reflect them on the contents of the assets management master database.

The person in charge of stocktaking performs stocktaking using such an assets management system as described above, whereby there is no need to use any ledger, and a stocktaking work can be performed with ease without causing personal mistakes such as a mistake in checking and a mistake in entry/posting. In addition, since the information regarding the asset management articles is stored in the assets management master database, the management and/or retrieval of idle asset articles can be conducted with ease.

In the assets management system described above, when the data corresponding to the bar code (management number) read out by the bar code reader has not been registered in the database for stocktaking and the assets management master database, namely, an asset article not registered in the database for stocktaking and the assets management master database is retrieved during the stocktaking work, the person in charge of stocktaking makes memoranda of detailed information such as an equipment name, an installation post, an installation place, a user, use conditions, stocktaking conditions and a stocktaking date as to the asset article in addition to the bar code information (management number) stuck on the asset article and informs a responsible person of the assets management of the information at any time or collectively at the time the stocktaking has been completed. The responsible person of the assets management performs correction/new registration of the assets management master data on the basis of the information informed by the person in charge of stocktaking.

Accordingly, there is a possibility that personal mistakes such as a mistake in entry, a mistake in data entry and/or a mistake in posting may occur when the person in charge of stocktaking makes memoranda, or the responsible person of the assets management makes data entry/posting, and so correction/new registration of the assets management master data may not be correctly conducted. There is also a problem that the person in charge of stocktaking must make memoranda of detailed information of the asset article as described above to take labor for such a work.

With foregoing problems in view, the present invention has been made and has as its object the provision of an assets management system capable of correctly performing assets management by correctly and rapidly conducting updating or new registration to a master database when an asset article not existing in a specified database or master database is retrieved upon stocktaking of an asset article, and a terminal for assets management and an assets management apparatus.

DISCLOSURE OF THE INVENTION

The present invention is a stocktaking asset management system which uses a mobile terminal (20). As illustrated in FIG. 1, this system includes an assets management apparatus (host) (10) and a terminal (20). The assets management apparatus (10) includes a CPU (11), a memory (12), a key board (mouse) (13), a display (14) and an interface unit (I/F) (15). The terminal (20) includes a CPU (21), a memory (22), a key board (mouse) (23), a display (24), a touch panel (241), an interface unit (I/F) (25) and a bar code reader (scanner) (26).

In the host (10), the CPC (11) serves to control the operation of the host (10) and fulfills functions of an extracting and registering means (111), a retrieving means (112), a setting means (113), an answering means (114), a reflecting means (115) and a display control unit (116).

The extracting and registering means (111) extracts data necessary for the stocktaking from the master database (121) stored in memory (12). The retrieving means (112) retrieves data (records) from the master database (121). The setting means (113) serves to set validity or invalidity of an inputting operation on the side of the mobile computer (20) prior to a stocktaking work of an asset article (100). The answering means (114) serves to retrieve information regarding the asset article (100) from the master database (121) in response to the inquiry from the checking means (212) of the mobile computer (20). The reflecting means (115) serves to update information regarding the asset article (100) input in the mobile computer (20) on the master database (121). The display control unit (116) serves to control the display (14).

In the mobile computer (20), the CPC (21) serves to control the operation of the mobile computer (20) and fulfills functions of a retrieving means (211), an updating means (212), a checking means (213), an urgently registering means (214) and an urgently newly registering means (215). Further, memory 22 in mobile computer (20) includes a specified database (221), an emergency registration database (222) and an emergency new registration database (223).

The retrieving means (211) serves to retrieve information regarding an asset article (100) using a bar code (101) from the specified database (221). The updating means (212) serves to update data on an asset article (100) recognized as existing in the specified database (221) by the retrieving means (211). The checking means (213) serves to inquire of the host (10) about an asset article (100) not existing in the specified database (221) to determine if it exists in the master database (121). The urgently registering means (214) operates when the data corresponding to the management number does not exist in the specified database (221) but does exists in the master database (121). The urgently registering means (214) then registers the data in the emergency registration database (222). The urgently newly registering means (215) operates when the data corresponding to the management number does not exist in either the specified database (221) or in the master database (121). The urgently newly registering means (215) then updates the emergency new registration database (223) with information supplied by the operator.

BRIEF DESCRIPTION OF THE DRAWING

FIG. 5(A) illustrates an example of data before stocktaking in a master database according to this embodiment.

FIG. 5(B) illustrates an example of data after reflection of the result of the stocktaking in the master database according to this embodiment.

FIG. 6(A) illustrates an example of data in a specified database before stocktaking, which was prepared by extracting from the master database in this embodiment.

FIG. 6(B) illustrates an example of data in the specified database after stocktaking in this embodiment.

FIG. 7(A) illustrates an example of data read out from the master database to an emergency registration database in this embodiment.

FIG. 7(B) illustrates an example of emergency registration data corrected in the emergency registration database in this embodiment.

FIG. 8 illustrates an example of emergency new registration data registered in an emergency new registration database in this embodiment.

BEST MODE FOR CARRYING OUT THE INVENTION

The embodiments of the present invention will hereinafter be described with reference to the accompanying drawings.

Figure 1:
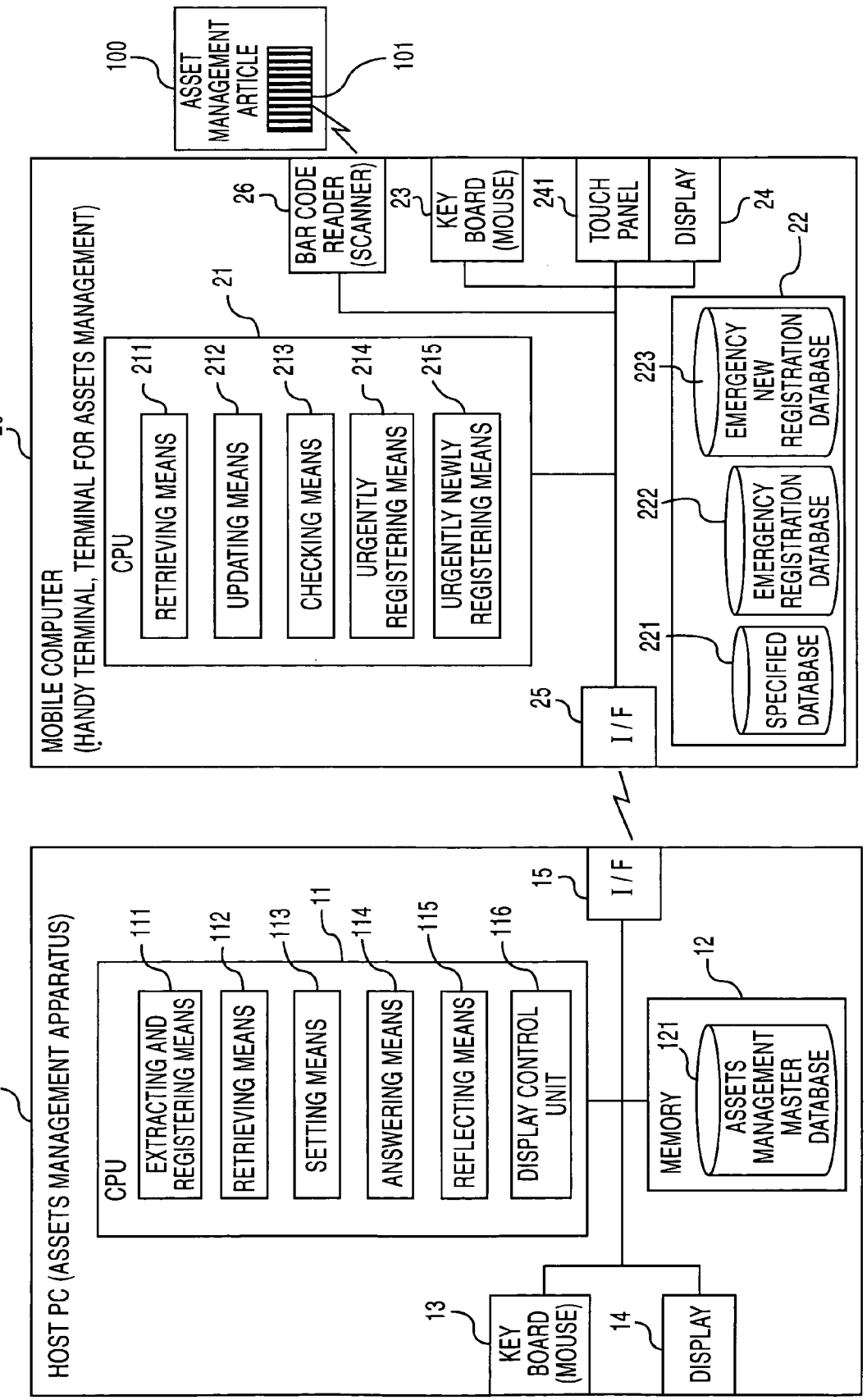
FIG. 1 is a block diagram illustrating the hardware constitution and functional constitution of an assets management system as an embodiment of the present invention.
Figure 2:
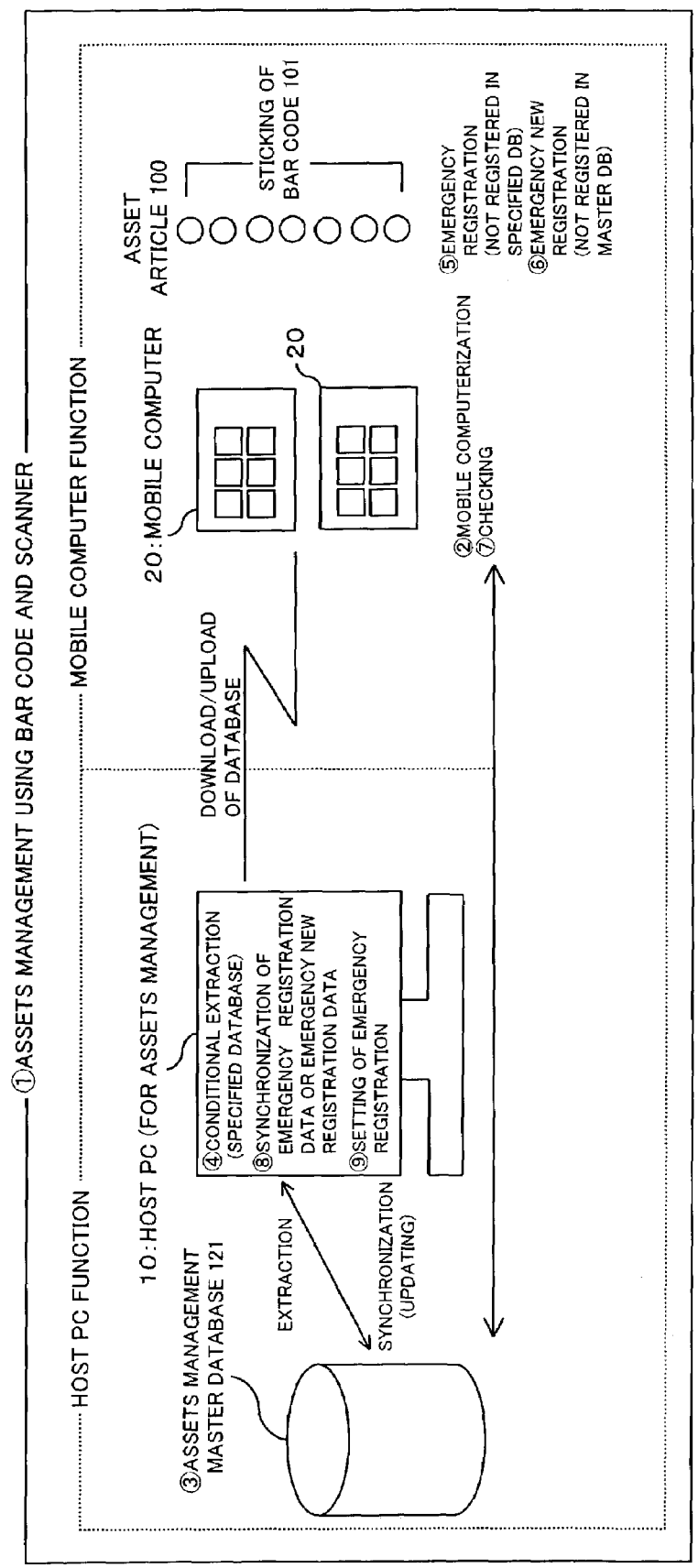
FIG. 2 typically illustrates the function and operation of the assets management system according to this embodiment.

As illustrated in FIGS. 1 and 2, an assets management system 1 according to this embodiment is constructed by connecting a host PC (assets management apparatus; hereinafter may be referred to as "host" merely) 10 and a mobile computer (terminal for assets management) 20 to each other in such a manner that data communication can be performed.

As a manner of performing data communication between the host 10 and the mobile computer 20, there is adopted a method in which the mobile computer 20 is connected to a communication adaptor (not illustrated) to perform data communication between the host 10 and the mobile computer 20 through the communication adaptor, in addition to radiocommunication using, for example, radio waves or infrared radiation. In any way, these communication methods have heretofore been widely known.

In the assets management system 1, the host 10 serves as a center of the system 1 and has an assets management master database (hereinafter may be referred to as master database merely; the details thereof will be described subsequently) 121 storing assets management master data that are information regarding asset management articles 100. The mobile computer 20 is a portable terminal (portable information processing apparatus; handy terminal) used upon an actual stocktaking work of the asset management articles 100.

When the assets management system 1 according to this embodiment is adopted, bar codes 101 with management numbers (identification information) characteristic of individual articles to be managed, i.e., asset articles (asset management articles) 100 subjected to stocktaking encoded are stuck in advance on the asset articles, respectively, as illustrated in FIG. 1.

Information regarding the asset articles 100 is registered in advance as assets management master data correspondingly to the management numbers of the individual asset articles 100 in the assets management master database 121 in the host 10 as shown in FIG. 5(A).

Management numbers are set as information for identification of the asset articles 100 in the assets management master data. Data of the bar codes stuck on the asset articles 100 are used for these management numbers. In an example illustrated in FIG. 5(A), management master data regarding 3 asset articles 100, to which management numbers "XXXXXXXX", "XXXXXXXY" and "XXXXXXYY" have been respectively attached, are registered.

In the assets management master data of this embodiment as illustrated in FIG. 5(A), for example, Equipment name, Installation post (Installation floor), Installation place, Use conditions, User, Stocktaking conditions, Stocktaking date, Person in charge of stocktaking, Notes are registered every asset article following the management number.

The equipment name specifically indicates the kind of an asset article 100. In FIG. 5(A), all the names are expressed as "PC (personal computer body)". Incidentally, examples of specific kinds (equipment names) of the asset management articles 100 include fixtures used in an enterprise, bodies, displays, key boards and mice of personal computers, and besides various articles such as software,.printers, scanners, copying machines, facsimiles, telephones, desks, chairs and bookshelves.

As the installation post (installation floor), a name of a section, by which each asset article 100 is used (owned), is registered. Specifically, a name of a department or section, or a floor name is registered. In the specific example shown in FIG. 5(A), "AA Section" and "AB Section" are registered. Incidentally, the name registered may be either an actual name or an identification symbol that can identify the section.

As the installation place, a name of a place, where each asset article 100 is installed in the installation post (installation floor), is registered. Specifically, a name of a room is registered. In the specific example shown in FIG. 5(A), room names "B1 Room", "B2 Room" and "C1 Room" are registered. Incidentally, the name registered may be either an actual name or an identification symbol that can identify the installation place.

As the use conditions, information as to whether each asset article 100 is "in no use" or "in use" is registered. When it is "in use", a name of a user of the asset article 100 is registered in the next column headed User. In the specific example shown in FIG. 5(A), "CC" and "FF" are registered as the names of users. Incidentally, "–", that means uncertainty, is entered and registered in the column of User of an asset article 100 "in no use" as illustrated in, for example, FIG. 5(A).

As the stocktaking conditions, information as to whether each asset article 100 has been already subjected to stocktaking or not is registered upon stocktaking. When it has been subjected to the stocktaking, "Subjected" is registered, while "Not subjected" is registered when it is not subjected to stocktaking. In FIG. 5(A), a master database 121 in which data right before stocktaking have been stored is shown. In the column of Stocktaking conditions, "subjected", which is the condition when stocktaking has been lastly performed on each asset article 100, is registered.

As the stocktaking date, the date when stocktaking has been actually performed is stored upon the stocktaking. In FIG. 5(A), the master database 121 in which data right before stocktaking have been stored is shown as described above. In the column of Stocktaking date, "000630" (Jun. 30, 2000), which is the date when stocktaking has been lastly performed on each asset article 100, is registered.

As the person in charge of stocktaking, a name of a person who has actually performed a stocktaking work, or an identification symbol that can specify the person, is stored upon the stocktaking work. In FIG. 5(A), the master database 121 in which data right before stocktaking have been stored is shown as described above. In the column of Person is charge of stocktaking, "DE", which is a name (or identification symbol) of a person who has lastly performed stocktaking on each asset article 100, is registered.

Incidentally, information inputted as needed is stored in the column of Notes. The information stored in this column of Notes is not described in detail herein because it varies according to its conditions or a manner of individual assets management.

Every time stocktaking of each asset article 100 is performed, the above-described various kinds of data in the master database 121 are corrected or updated according to the conditions of the stocktaking. For example, such contents of data as shown in FIG. 5(A) are updated to the such contents of data as shown in FIG. 5(B) after the result of the stocktaking is reflected as will be described subsequently.

When a new asset article 100 is added, a management number (bar code data) allotted to the new asset article 100 and various kinds of information regarding the asset article 100 are added and registered to the assets management master database 121 each time. A bar code 101 with the management number corresponding to the new asset article 100 encoded is printed by a bar code printer (not illustrated) in the host 10, and a worker sticks the bar code 101 on the asset article 100.

When an asset article 100 is discarded, the information regarding its corresponding asset article 100 is deleted from the assets management master database 121.

When a stocktaking work is performed, the information stored in the assets management master database 121 in the host 10 as described above is down-loaded as a specified database 221 to the mobile computer 20 as will be described subsequently.

As illustrated in FIG. 1, the host 10 in the system 1 according to this embodiment is constructed by communicably connecting a CPU 11, a memory 12, a key board (mouse) 13, a display 14 and an interface unit (I/F) 15 to one another, and the mobile computer 20 in the system 1 according to this embodiment is constructed by communicably connecting a CPU 21, a memory 22, a key board (mouse) 23, a display 24, a touch panel 241, an interface unit (I/F) 25 and a bar code reader (scanner) 26 to one another.

In the host 10, the CPC 11 serves to control the operation of the host 10 and fulfills functions as extracting and registering means 111, retrieving means 112, setting means 113, answering means 114, reflecting means 115 and a display control unit 116.

The memory 12 stores programs necessary for the CPU 11 to fulfill the above-described functions, in addition to various kinds of data and has the assets management master database 121 as described above by reference to FIG. 5(A). Incidentally, the master database 121 may be stored in a memory installed out of the host 10 as shown in FIG. 2.

The key board (mouse) 13 is operated by an operator (a responsible person of the assets management, or the like) to fulfill a function of inputting data such as numerical values and an operation indicating function. The display 14 fulfills a function as a display unit for displaying various kinds of information and is constructed by, for example, LCD (Liquid Crystal Display), CRT (Cathode Ray Tube), PDP (Plasma Display Panel) or the like. The interface unit 15 serves to perform communication with the mobile computer 20.

In the mobile computer 20 on the other hand, the CPC 21 serves to control the operation of the mobile computer 20 and fulfills functions as retrieving means 211, updating means 212, checking means 213, urgently registering means 214 and urgently newly registering means 215.

The memory 22 stores programs necessary for the CPU 21 to fulfill the above-described functions, in addition to various kinds of data and has a specified database 221, an emergency registration database 222 and an emergency new registration database 223 which will be described subsequently. In this memory 22 (databases 221 to 223), is stored and registered information inputted from the key board (mouse) 23 and the touch panel 241.

The key board (mouse) 23 is operated by an operator (a person in charge of stocktaking, or the like) to fulfill a function of inputting data such as numerical values and an operation indicating function.

The display 24 fulfills a function as a display unit for displaying various kinds of information like the display 14 and is constructed by, for example, LCD, CRT, PDP or the like. The touch panel 241 for inputting data is also provided in this display 24 in such a manner that a person in charge of stocktaking touches an item displayed on the display 24 to input information regarding its corresponding item. The touch panel 241 fulfills a function as inputting means, which will be described subsequently, together with the key board (mouse) 23.

The interface unit 25 serves to perform communication with the host 10. The bar code reader (scanner) 26 fulfills a function as reading means by reading the bar code 101 stuck on the asset article 100 as described above to read specific information (management number) for specifying the asset article 100 subjected to stocktaking from the asset article 100.

In the CPU 11 of the host 10, the extracting and registering means 111 extracts data necessary for the stocktaking from the master database 121 prior to a stocktaking work of the asset article 100 to register (down-load) the data as the specified database 221 in the memory 22 of the mobile computer 20 and is so constructed that condition retrieval is performed according to prescribed conditions using the retrieving means 112, which will be described subsequently, thereby extracting the specified database 221 from the master database 121. Incidentally, the above-described conditions are inputted by the key board (mouse) 13.

For example, when stocktaking is performed in a prescribed section, the extracting and registering means 111 retrieves data (record) registering the prescribed section in the column of Installation post of the master database 121 using the retrieving means 112, thereby extracting data of an asset article 100 registered as that installed in the prescribed section from the master database 121 to prepare the specified database 221.

More specifically, a specified database 221 shown in FIG. 6(A) was obtained from the master database 121 shown in FIG. 5(A) as the result that retrieval was conducted by using an installation post name, "AA Section", as retrieving conditions (key). In FIG. 6(A), data (management numbers "XXXXXXXX" and "XXXXXXXY") regarding 2 asset articles 100 belonging to "AA Section" are shown. In the specified database 221 right after (before stocktaking) prepared by the extracting and registering means 111, "Not subjected" is set as the stocktaking conditions, and uncertainty ("–") is set as both stocktaking date and person in charge of stocktaking like an example illustrated in FIG. 6(A).

The retrieving means 112 performs retrieving processing to the master database 121 in cooperation with the extracting and registering means 111 as described above and also performs retrieving processing to the master database 121 in response to the indication from the answering means 114 which will be described subsequently.

The setting means 113 serves to set validity/invalidity of an inputting operation on the side of the mobile computer 20 prior to a stocktaking work of an asset article 100, i.e., validity/invalidity of an emergency registration operation and an emergency new registration operation which will be described subsequently. This validity/invalidity is set according to an inputting operation by the key board (mouse) 13, and the set information (validity/invalidity) is added to the specified database 221 and notified to the mobile computer 20 together with this specified database 221 so as to be registered and set.

The answering means 114 serves to retrieve the information regarding the asset article 100 from the master database 121 in response to the inquiry from the checking means 212 (described below) of the mobile computer 20 and answer the result thereof to the mobile computer 20. Upon the retrieval from the master database 121, the function of the above-described retrieving means 112 is used.

The reflecting means 115 serves to reflect the information regarding the asset article 100 inputted in the mobile computer 20 upon the stocktaking of the asset article 100 on the master database 121. In this embodiment, the reflecting means 115 operates so as to reflect data stored in the databases 221 to 223 (described below) uploaded from the mobile computer 20 after completion of the stocktaking on the master database 121.

More specifically, the reflecting means 115 operates so as to rewrite and update data [see FIG. 6(B)] stored in the specified database 221 as data of their corresponding management numbers, and besides update the master database 121 on the basis of emergency registration data [see FIG. 7(B)] stored in the emergency registration database 222 and newly add and register emergency new registration data [see FIG. 8] stored in the emergency new registration database 223 to the master database 121. Incidentally, the updating of the master database 121 based on the emergency registration data is actually performed by rewriting the emergency registration data as data of its corresponding management number.

For example, the specified database 221 shown in FIG. 6(B), the emergency registration database 222 shown in FIG. 7(B) and the emergency new registration database 223 shown in FIG. 8 are reflected on the master database 121 shown in FIG. 5(A) by the reflecting means 115, whereby the master database shown in FIG. 5(A) is updated as shown in FIG. 5(B).

The display control unit 116 serves to control the displayed state of the display 14 and has a function of controlling the displayed state of the display 14 in such a manner that the information reflected on the master database 121 by the reflecting means 115 is emphatically displayed in the display 14, before the reflecting means 115 reflects the information regarding the asset article 100 on the master database 121. Examples of a manner of the emphatic display include a method in which a display position of the information (information on change or addition) is displayed by reverse display or blink display.

In the CPU 21 of the mobile computer 20 on the other hand, the retrieving means 211 serves to retrieve information regarding an asset article 100, on which a bar code 101 has been stuck, from the specified database 221 on the basis of the information (management number) of the bar code 101 read out by the bar code reader 26. In other words, the retrieving means 211 uses the management number as a key to retrieve data having the same management number in the specified database 221.

The updating means 212 serves to update data of an asset article 100 recognized as existing in the specified database 221 by the retrieving means 211. At this time, the updating means 212 sets "Subjected" as the stocktaking conditions and enters a stocktaking date and a person in charge of stocktaking. These stocktaking conditions, stocktaking date and person in charge of stocktaking may be inputted and set either by operating the key board (mouse) 23 and/or the touch panel 241 or automatically without conducting any manual inputting operation. When the installation place, use conditions and/or user about each asset article 100 is changed, the change information thereof is inputted by the key board (mouse) 23 and/or the touch panel 241, and the updating means 212 corrects and updates the data in the specified database 221 on the basis of the inputted information.

For example, when management numbers XXXXXXXX and XXXXXXXY are read out by the bar code reader 26, the updating means 212 enters "Subjected", "001012" and "DD" in the columns of Stocktaking conditions, Stocktaking date and Person in charge of stocktaking in the respective data, respectively, as shown in, for example, FIG. 6(B) because data corresponding to these management numbers XXXXXXXX and XXXXXXXY exist in the specified database 221 shown in FIG. 6(A). With respect to the asset articles 100 of the management numbers XXXXXXXX and XXXXXXXY, thereby, registration to the effect that the stocktaking has been performed by "DD" on Oct. 12, 2000 is made.

In the data of the management number XXXXXXXY shown in FIGS. 6(A) and 6(B), the installation place, use conditions and user are changed. The data that "B2 Room", "In no use" and "Uncertainty" are set as the installation place, use conditions and user, respectively, as shown in FIG. 6(A) before the stocktaking are changed to data that "B1 Room", "In use" and "EE" are set as the installation place, use conditions and user, respectively, as shown in FIG. 6(B) after the stocktaking. Such data changes are made by the updating means 212 on the basis of the information inputted from the key board (mouse) 23 and/or the touch panel 241 as described above.

The checking means 213 serves to inquire of the host 10 about an asset article (i.e., an asset article 100 not existing in the specified database 221) recognized as not existing in the specified database 221 by the retrieving means 211 as to whether the information regarding the asset article 100 corresponding to the information (management number) of the bar code 101 read out by the bar code reader 26 exists in the master database 121 or not.

Incidentally, the answering means 114 in the host 10 described above conducts retrieval using the function of the retrieving means 112 and the management number as a key in response to the inquiry from the checking means 212, thereby retrieving data having the same management number in the master database 121. When no date corresponding to the management number exists, that effect is answered. When date corresponding to the management number exist on the other hand, the data are read out to answer that effect as the result of the retrieval.

The urgently registering means 214 operates when an answer to the effect that the information (data corresponding to the management number) regarding the asset article 100 exists in the master database 121 is given by the answering means 114, in other words, when the data corresponding to the management number does not exist in the specified database 221, but exists in the master database 121. In such a case, the urgently registering means 214 receives the data (the answer from the answering means 114) corresponding to the management number, registers the data in the emergency registration database 222, corrects the data using the key board (mouse) 23 or the touch panel 241 on the basis of the information inputted by the person in charge of stocktaking and then stores the corrected data as emergency registration data in the emergency registration database 222. At this time, the urgently registering means 214 not only sets the stocktaking conditions as "Subjected", but also fulfills a function of entering the stocktaking date and the person in charge of stocktaking like the updating means 212.

For example, when a management number XXXXXXXY is read out by the bar code reader 26, data corresponding to the management number XXXXXXXY do not exist in the specified database 221 shown in FIG. 6(A), but exists in the master database 121 shown in FIG. 5(A). Accordingly, the data corresponding to the management number XXXXXXXY are sent from the host 10 (answering means 114) to the mobile computer 20 and registered in the emergency registration database 222 as shown in FIG. 7(A). At this time, the data corresponding to the management number XXXXXXXY in the master database 121 were not extracted as the specified database 221 because the installation post was set as "AB Section". Thus, the person in charge of stocktaking operates the key board (mouse) 23 or the touch panel 241 to input "AA Section" as Installation post. In response to this, the urgently registering means 214 corrects Installation post from "AB Section" to "AA Section" as shown in FIG. 7(B), and moreover enters "Subjected", "001012" and "DD" in the columns of Stocktaking conditions, Stocktaking date and Person in charge of stocktaking, respectively. The data of the asset article 100 of the management numbers XXXXXXXY are thereby registered in the emergency registration database 222 as emergency registration data, and registration to the effect that the stocktaking has been performed by "DD" on Oct. 12, 2000 is made in the data.

The urgently newly registering means 215 operates when an answer to the effect that the information (data corresponding to the management number) regarding the asset article 100 does not exist in the master database 121 is given by the answering means 114, in other words, when the data corresponding to the management number exist neither in the specified database 221 nor in the master database 121. In such a case, the urgently newly registering means 215 receives the answer from the answering means 114 and then stores information newly inputted by the person in charge of stocktaking using the key board (mouse) 23 or the touch panel 241 as emergency new registration data regarding the asset article 100 having that management number in the emergency new registration database 223. At this time, the urgently newly registering means 215 not only sets the stocktaking conditions as "Subjected", but also fulfills a function of entering the stocktaking date and the person in charge of stocktaking like the updating means 212.

For example, when a management number XXXXXYYY is read out by the bar code reader 26, data corresponding to the management number XXXXXYYY exist neither in the specified database 221 shown in FIG. 6(A) nor in the master database 121 shown in FIG. 5(A). Accordingly, an answer to the effect that no data exist in the master database 121 is sent from the host 10 (answering means 114) to the mobile computer 20. In response to this, the person in charge of stocktaking operates the key board (mouse) 23 or the touch panel 241 to newly input various kinds of information (equipment name, installation post, installation place, use conditions, etc.) regarding the asset article 100 of that management number XXXXXYYY. The urgently newly registering means 215 then registers the newly inputted information as emergency new registration data in the emergency new registration database 223 corresponding to the management number XXXXXYYY as shown in FIG. 8. In the example shown in FIG. 8, "PC", "AA Section", "B1 Room", "In use" and "HH" are registered as Equipment name, Installation post, Installation place, Use conditions and User, respectively, as the emergency new registration data, and "Subjected", "001012" and "DD" are entered in the columns of Stocktaking conditions, Stocktaking date and Person in charge of stocktaking in that data, respectively.

Incidentally, the key board (mouse) 23 and the touch panel 241 in the mobile computer 20 according to this embodiment function as inputting means for inputting the information regarding the asset article 100 recognized as not existing in the specified database 221 by the retrieving means 211 as described above.

The assets management system is also so constructed that when the emergency registration operation and emergency new registration operation is set as invalidity by the setting means 113 of the host 10, the functions of the checking means 213, the urgently registering means 214 and the urgently newly registering means 215 in the mobile computer 20 become invalid and can not be used.

Here, the functions and operations of the assets management system 1 according to this embodiment as described above are illustrated collectively in FIG. 2. As shown in FIG. 2, the assets management system 1 according to this embodiment is constructed so as to execute functions or operations of ① to ⑨.

① Assets management using a bar code 101 and a bar code reader (scanner) 26.

② Stocktaking work using a mobile computer 20 mounting a radiocommunication or LAN function (function of the mobile computer 20).

③ Function of registering information regarding all asset management articles 100 as a master database 121 (function of a host PC 10).

④ Function of conditionally extracting a specified database 221 for confirmation of stocktaking of an asset article 100 from the master database 121 (function of the host PC 10; extracting and registering means 111, retrieving means 112).

⑤ Emergency registration function when an asset management article 100 not existing in the specified database 221, but existing in the master database 121 is detected in the mobile computer 20 (emergency registration database 222, urgently registering means 214).

⑥ Emergency new registration function when an asset management article 100 existing neither in the specified database 221 nor in the master database 121 is detected in the mobile computer 20 (emergency new registration database 223, urgently newly registering means 215).

⑦ Function of inquiring of the master database when an asset management article 100 not existing in the specified database 221 (checking function; checking means 213).

⑧ Function of reflecting emergency registration data or emergency new registration data on the master database 121 and updating the master database (synchronizing function of database; reflecting means 115).

⑨ Function of setting validity/invalidity of the emergency registration function or emergency new registration function in the mobile computer 20 (operation environment setting function; setting means 113).

Figure 3:
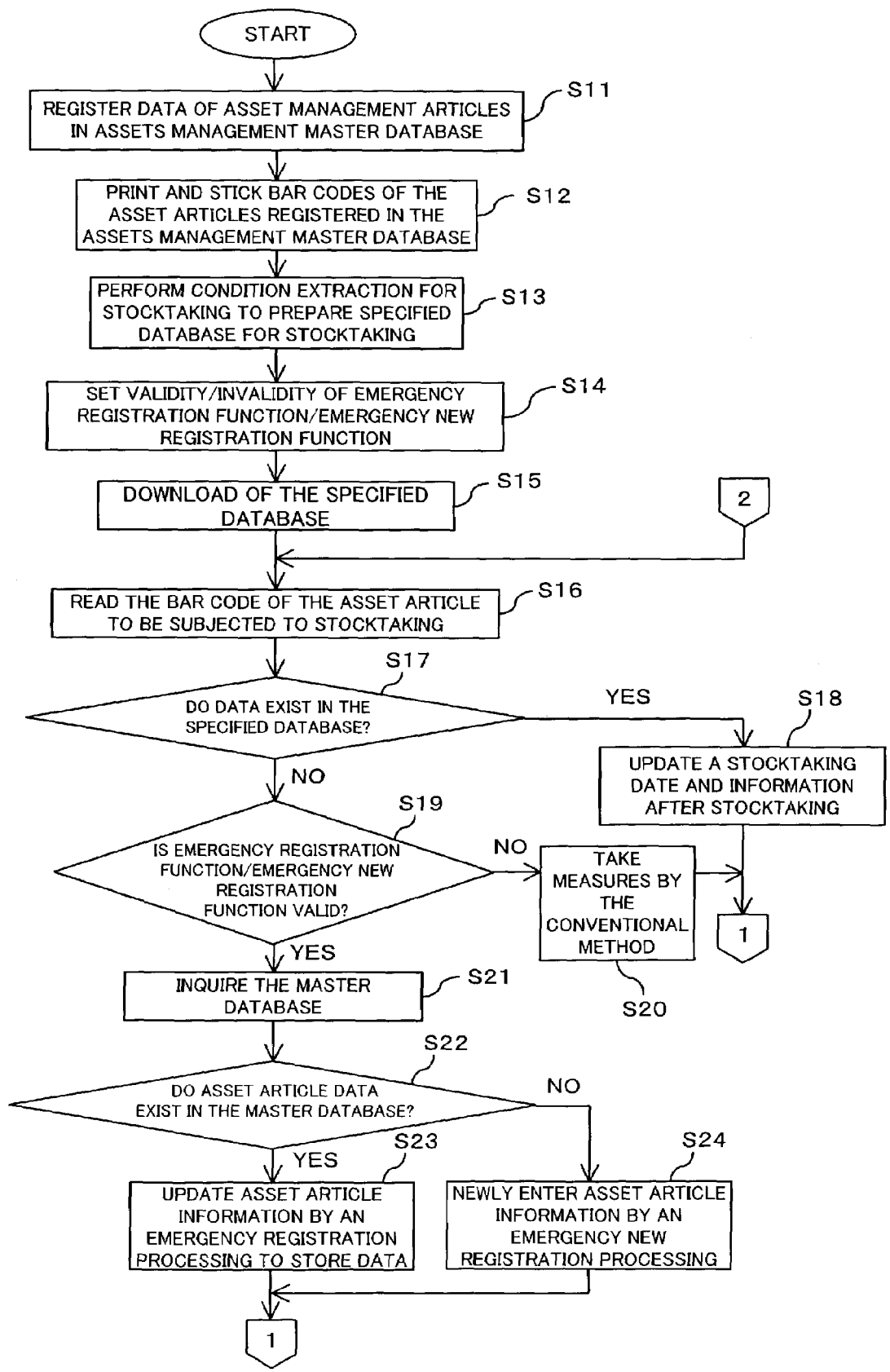
FIGS. 3 and 4 are flow charts for explaining the procedures of a stocktaking work by the assets management system according to this embodiment.
Figure 4:
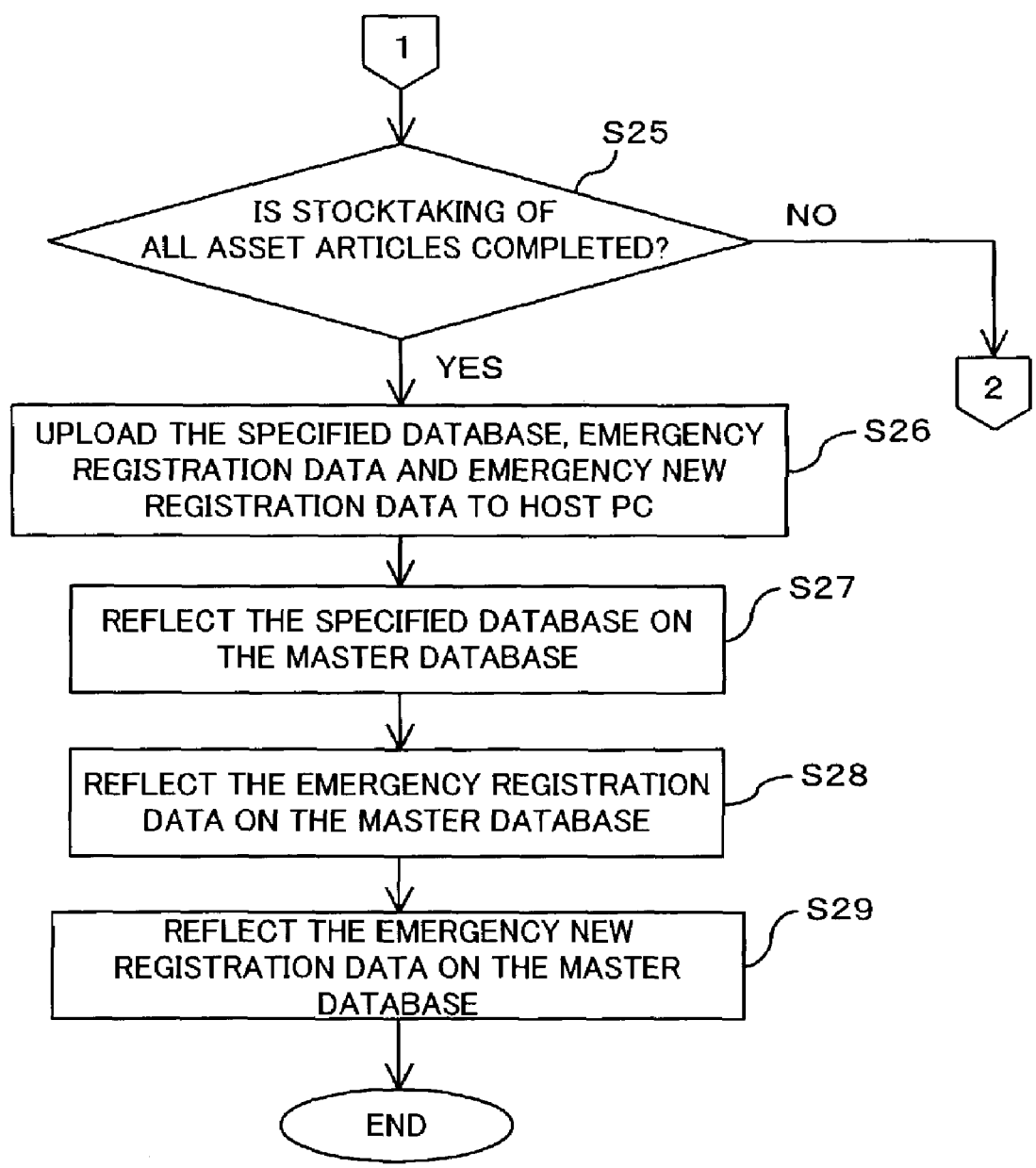

The working procedures of stocktaking by the assets management system 1 according to this embodiment will now be described with reference to FIGS. 3 and 4. FIGS. 3 and 4 are flow charts (Steps S11 to S29) for explaining the working procedures thereof. A series of processing procedures are illustrated in FIGS. 3 and 4.

When fixed asset articles are newly purchased, and/or lease articles or rental articles are newly contracted, such fixed asset articles, lease articles and/or rental articles are first registered as asset management articles 100 in a master database 121 in a host 10 (Step S11). This registering operation is performed by a responsible person of assets management using a key board (mouse) 13 of the host 10. At this time, management numbers allotted to the respective asset management articles 100 are registered, and at the same time various kinds of information of the asset management articles 100, such as equipment names, installation posts, installation places, use conditions and users are also registered corresponding to the management numbers. Incidentally, since the new asset articles 100 are never yet subjected to stocktaking, information regarding stocktaking conditions, stocktaking date and a person in charge of stocktaking is set as uncertainty.

The management number is unique every asset article, and a bar code with the management number encoded is printed by a bar code printer (not illustrated) in the host 10 and stuck on the asset article 100 by a responsible person of assets management (Step S12). The registration operation of the asset articles 100 is completed by these steps. When all the asset articles 100 have been already registered, and the bar code 101 has been stuck thereon, the registration operation by Steps S11 and S12 are unnecessary.

When research of assets management is required (upon stocktaking of asset articles 100), the responsible person of assets management indicates a confirmation range (for example, every floor or every post) of the asset articles 100 by a key board (mouse) 13 or the like to execute condition extraction by extracting and registering means 111 and retrieving means 112, thereby preparing a specified database 221 [see FIG. 6(A)] from the master database 121 [see FIG. 5(A)] (Step S13) to down-load it to a memory 22 of a mobile computer 20 (Step S15). At this time, information for validating/invalidating an emergency registration function and an emergency new registration function in the mobile computer 20 is added to the specified database 221 using setting means 113 (Step S14).

Thereafter, a person in charge of stocktaking starts an actual stocktaking work (Steps S15 to S29) using the mobile computer 20 in which the specified database 221 and the validity/invalidity information have been set and registered as described above.

Basic processes by the person in charge of stocktaking, who executes the stocktaking, are roughly divided into two processes of a process (Step S16) of reading out the bar code 101 stuck on each asset management article 100 by a bar code reader 26 of the mobile computer 20 and a process of inputting various kinds of information (assets manager, installation place, use conditions, user, stocktaking conditions, stocktaking date, person in charge of stocktaking, etc.) regarding each asset article 100 by a key board (mouse) 23 and/or a touch panel 241.

When an asset article 100 existing in the specified database 221 is detected as the result of reading out the bar code 101 (YES route in Step S17), the stocktaking conditions, stocktaking date and person in charge of stocktaking in the data corresponding to the bar code 101 (management number) are updated in the specified database 221 by updating means 212 (Step S18), followed by Step S25 which will be described subsequently.

In Step S18, the stocktaking conditions, stocktaking date and person in charge of stocktaking are only updated like the data of the management number XXXXXXXX shown in FIGS. 6(A) and 6(B) unless the installation place, use conditions and user as to the asset article 100 are changed at all. When the installation place, use conditions and user as to the asset article 100 are changed on the other hand, the installation place, use conditions and user are changed like the data of the management number XXXXXXXY shown in FIGS. 6(A) and 6(B), and the stocktaking conditions, stocktaking date and person in charge of stocktaking are updated.

When an asset article 100 not existing in the specified database 221 is detected as the result of reading out the bar code 101 (NO route in Step S17), the setting of validity/invalidity of the emergency registration function and emergency new registration function is recognized (Step S19).

When set as invalidity (NO route in Step S19), measures are taken in the same manner as before (Step S20), followed by Step S25 which will be described subsequently. In other words, the person in charge of stocktaking makes memoranda of detailed information such as an equipment name, an installation post, an installation place, a user, use conditions, stocktaking conditions and a stocktaking date as to the asset article 100 not existing in the specified database 221, in addition to the information (management number) of the bar code 101 stuck on the asset article 100 (Step S20) and informs the responsible person of the assets management of the information at any time or collectively at the time the stocktaking has been completed. The responsible person of the assets management performs correction/new registration of the assets management master data on the basis of the information informed by the person in charge of stocktaking.

When set as invalidity (YES route in Step S19) on the other hand, an inquiry about the asset article 100 is made to the master database 121 of the host 10 by checking means 213 (Step S21). Specifically, the management number read out of the bar code 101 is sent to the host 10 using a radiocommunication or in-company LAN function. In the host 10, retrieval of the master database 121 is performed by using functions of retrieving means 112 and answering means 114 and the management number as a key. The result of the retrieval is sent back from the host 10 to the mobile computer 20 by the answering means 114.

When the date of the asset article 100 are registered in the master database 121 as the result of the retrieval, that effect is informed the mobile computer 20 by sending the data registered in the master database 121 (YES route in Step S22). As a main cause that such conditions occur, is considered, for example, a case where the installation post information of the master database 121 is not correctly set.

In this case, the data sent from the host 10 are registered in an emergency registration database 222 corresponding to the management number by urgently registering means 214 and then corrected on the basis of the information inputted by the person in charge of stocktaking using the key board (mouse) 23 or the touch panel 241. The corrected data are stored as emergency registration data in the emergency registration database 222. At this time, Subjected is set as the stocktaking conditions by the urgently registering means 214, and a stocktaking date and a person in charge of stocktaking are also entered (Step S23), followed by Step S25.

When the data of the asset article 100 are not registered in the master database 121 as the result of the inquiry, that effect is informed the mobile computer 20 from the host 10 (NO route in Step S22). As a main cause that such conditions occur, is considered, for example, a case where data registration in the master database 121 is mistaken, or a case where data are erroneously deleted from the master database 121.

In this case, the person in charge of stocktaking inputs new registration data information (emergency new registration data) of the asset article 100 by the key board (mouse) and/or the touch panel 241. The information inputted in such a manner is stored in the emergency new registration database 223 by urgently newly registering means 215 corresponding to the management number as shown in FIG. 8. At this time, "Subjected" is set as the stocktaking conditions by the urgently newly registering means 215, and a stocktaking date and a person in charge of stocktaking are also entered (Step S24), followed by Step S25.

In Step S25, whether stocktaking as to all asset articles 100 to be subjected to the stocktaking work has been completed or not is judged. When the stocktaking is not completed (NO route), the process is returned to Step S15. When the stocktaking is completed (YES route), the person in charge of stocktaking ends the operation of the mobile computer 20 to up-load the updated data of the specified database 221 and the data stored in the emergency registration database 222 and the emergency new registration database 223 from a memory 22 of the mobile computer 20 to host 10 (Step S26). When the emergency registration function/emergency new registration function is set as invalidity, only the updated data of the specified database 221 are up-loaded.

In the host 10, the specified database 221 up-loaded is synchronized with the master database 121, and the data of the specified database 221 are rewritten as corresponding data within the master database 121 by the reflecting means 115 to update the master database (Step S27). At this time, the host 10 has a checking function for preventing the specified database 221 from being unconditionally reflected on the master database 121.

In other words, in this embodiment, the information (information on change or addition) reflected on the master database 121 by the reflecting means 115 is emphatically displayed by reverse display or blink display in the display 14, before the reflecting means 115 reflects the information regarding the asset article 100 on the master database 121. The responsible person of the assets management can thereby visually confirm the information (change information or addition information) reflected on the master database 121. The responsible person of the assets management, who has referred to this emphatic display, judges whether the information is reflected on the master database 121 or not, and inputs the result of the judgment by the key board (mouse) 13 to indicate whether reflection of the updated information on the master database 121 is conducted or not.

Hereinafter, in the same manner as described above, in the host 10, the data of the emergency registration database 222 up-loaded are reflected on the master database 121 by the reflecting means 115 (Step S28), and the data of the emergency new registration database 223 are added to the master database 121 (Step S29). When the emergency registration function/emergency new registration function is set as invalidity, the processing steps of S28 and S29 are omitted.

After completion of the stocktaking work, the master database 121 shown in FIG. 5(A) is thereby updated so as to be shown in FIG. 5(B).

As described above, according to the assets management system 1 as an embodiment of the present invention, when an asset article 100 not existing in the specified database 221 is detected, the information regarding the asset article 100 is inputted in the mobile computer 20 and reflected on the master database 121 by the reflecting means 115 in the host 10, thereby providing an emergency registration function/ emergency new registration function in the case where the asset article 100 not existing in the specified database 221 is detected.

When the asset article 100 not existing in the specified database 221 is detected, a two-step processing that a person in charge of stocktaking makes memoranda of detailed information of the asset article 100, and a responsible person of assets management then conducts corrective updating or new registration to the master database 121 while referring to the memoranda has heretofore been required, and so there has been a high possibility that mistakes in entry and mistakes in posting may occur. According to this embodiment permits, however, corrective updating or new registration to the master database 121 can be performed simply by inputting the information of the asset article 100 by a person in charge of stocktaking using the key board 23 or the like in the mobile computer 20.

Since the information urgently registered or urgently newly registered in the mobile computer 20 can thus be correctly reflected on the master database 121 to correctly and rapidly perform corrective updating or new registration to the master database 121, the contents registered in the master database 121 come to always coincide with the actual use conditions of the asset article 100, whereby correct assets management can be performed.

Since the information regarding the asset particle 100 can be emphatically displayed in the display 14 before the information is reflected on the master database 121 by the reflecting means 115, the responsible person of assets management can visually confirm the information (change information or addition information) reflected on the master database 121 and can judge whether change or addition to the master database 121 may be conducted or not.

Since validity/invalidity of an emergency registration operation/emergency new registration operation can be set by the setting means 113 prior to the stocktaking, The above-described emergency registration operation/emergency new registration operation is realized when the validity is set. When the invalidity is set on the other hand, the inputting operation of the information regarding the asset article 100 in the mobile computer 20 is invalidated. In other words, the reflection (change or addition) of the information on the master database 121 can be prohibited to protect the contents of the master database 121.

Still further, in the extracting and registering means 111 of the host 10, condition retrieval according to prescribed conditions is performed to extract the specified database 221 from the master database 121, whereby a specified database 121 containing only data satisfying the prescribed conditions can be prepared. For example, when stocktaking is performed at every post, floor or room, only information of asset articles 100 registered in advance as those belonging to the post, floor or room is extracted to prepare a specified database 221, whereby a required minimum specified database 221 can be prepared, and moreover data having no relation to the stocktaking can be protected.

The present invention should by no means be limited to the foregoing embodiment, and various changes or other modifications may be suggested without departing from the gist of the invention.

For example, such specific examples as shown in FIGS. 5(A) to 8 have been described as the master database 121, specified database 221, emergency registration database 222 and emergency new registration database 223. However, the present invention is not limited thereto. The data registered every asset article (management number) are also not limited to the examples (equipment name, installation post, installation place, use conditions, user, stocktaking conditions, stocktaking date, person in charge of stocktaking, notes) shown in FIGS. 5(A) to 8.

INDUSTRIAL APPLICABILITY

As described above, according to the present invention, when an asset article not existing in the specified database is detected, the information regarding the asset article is inputted by the inputting means in the terminal, and reflected on the master database by the reflecting means in the assets management apparatus. Since the information urgently registered or urgently newly registered in the terminal can thus be correctly reflected on the master database to correctly and rapidly perform corrective updating or new registration to the master database, the contents registered in the master database come to always coincide with the actual use conditions of the asset article, whereby correct assets management can be performed.

The present invention is suitable for use in stocktaking to manage asset articles (articles such as fixed asset articles, lease articles, rental articles and idle asset articles) in an enterprise, and the availability thereof is considered to be extremely high.

The invention claimed is:

1. An assets management system which comprises an assets management apparatus (10) having a master database (121) storing information regarding an asset article, and a terminal (20) connected to the assets management apparatus (10) in such a manner that data communication can be performed, and performs stocktaking of the asset article using the terminal (20), wherein the terminal (20) comprises:

a specified database (221) storing data necessary for the stocktaking, reading means (26) for reading specific information to identify the asset article from other asset articles, retrieving means (211) for retrieving information regarding the asset article from the specified database (221) on the basis of the specific information read out by the reading means (26), inputting means (23, 241) for inputting information regarding an asset article recognized as not existing in the specified database (221) by the retrieving means (211), checking means (212) for inquiring of the assets management apparatus (10) about the asset article recognized as not existing in the specified database (221) by the retrieving means (211) as to whether the information regarding the asset article corresponding to the specific information exists in the master database (121) or not, an emergency registration database (222) storing emergency registration data when an answer to the effect that the information regarding the asset article exists in the master database (121) is given as an answer from the assets management apparatus (10) in response to the inquiry from the checking means (212), an emergency new registration database (223) storing emergency new registration data when an answer to the effect that the information regarding the asset article does not exist in the master database (121) is given as an answer to the assets management apparatus (10) in response to the inquiry from the checking means (212), urgently registration means (214) for, when an answer to the effect that the information regarding the asset article exists in the master database (121) is given as an answer from the assets management apparatus (10) in response to the inquiry from the checking means (212), correcting the result of the retrieval from the master database (121) as the answer on the basis of the information regarding the asset article inputted from the inputting means (23, 241) and storing the corrected result of the retrieval as the emergency registration data in the emergency registration database (222), and urgently newly registering means (215), when an answer to the effect that the information regarding the asset article does not exist in the master database (121) is given as an answer from the assets management apparatus (10) in response to the inquiry from the checking means (212), storing the information regarding the asset article inputted from the inputting means (23, 241) as the emergency new registration data in the emergency new registration database (223), wherein the assets management apparatus (10) comprises:

extracting and registering means (111) for extracting the data necessary for the stocktaking from the master database (121) prior to the stocktaking and registering the data in the specified database (221) in the terminal (20), answering means (114) for answering the result of the retrieval of the information regarding the asset article from the master database (121) to the terminal (20) in response to the inquiry from the checking means (212), and reflecting means (115) for updating the information regarding the asset article inputted from the inputting means (23, 241) upon the stocktaking on the master database (121), wherein the reflecting means (115) updates the master database (121) on the basis of the emergency registration data stored in the emergency registration database (222) and adds the emergency new registration data stored in the emergency new registration database (223) to the master database (121).

2. The asset management system according to claim 1, wherein the assets management apparatus (10) has a display unit (14) for displaying various kinds of information and a display control unit (116) for controlling the display unit (14), and wherein the display control unit (116) controls the display state of the display unit (14) in such a manner that the information regarding the asset article reflected on the master database (121) by the reflecting means (115) is displayed in the display unit (14), before the reflecting means (115) updates the information regarding the asset article on the master database (121).

3. The assets management system according to claim 1 or 2, which comprises setting means (113) for setting validity or invalidity of an inputting operation by the inputting means (23, 241) prior to the stocktaking.

4. The assets management system according to any one of claims 1 or 2, wherein the extracting and registering means (111) performs condition retrieval according to prescribed conditions in the assets management apparatus (10), thereby extracting the specified database (221) from the master database (121).

5. A terminal for assets management, which is connected to an assets management apparatus (10) having a master database (121) storing information regarding an asset article in such a manner that data communication can be performed, and is used in stocktaking of the asset article, the terminal comprising:

a specified database (221) storing data necessary for the stocktaking, which is extracted from the master database (121), reading means (26) for reading specific information to identify the asset article from other asset articles, retrieving means (211) for retrieving information regarding the asset article from the specified database (221) on the basis of the specific information read out by the reading means (26), inputting means (23, 241) for inputting information regarding an asset article recognized as not existing in the specified database (221) by the retrieving means (211), checking means (212) for inquiring of the assets management apparatus (10) about the asset article recognized as not existing in the specified database (221) by the retrieving means (211) as to whether the information regarding the asset article corresponding to the specific information exists in the master database (121) or not, an emergency registration database (222) storing emergency registration data when an answer to the effect that the information regarding the asset article exists in the master database (121) is given as an answer from the assets management apparatus (10) in response to the inquiry from the checking means (212), an emergency new registration database (223) storing emergency new registration data when an answer to the effect that the information regarding the asset article does not exist in the master database (121) is given as an answer from the assets management apparatus (10) in response to the inquiry from the checking means (212), urgently registering means (214) for, when an answer to the effect that information regarding the asset article exist in the master database (121) is given as an answer form the assets management apparatus (10) in response to the inquiry from the checking means (212), correcting the result of the retrieval from the master database (121) as the answer on the basis of the information regarding the asset article inputted from the inputting means (23, 241) and storing the corrected result of the retrieval as the emergency registration data in the emergency registration database (222), and urgently newly registering means (215) for, when an answer to the effect that the information regarding the asset article does not exist in the master database (121) is given as an answer from the assets management apparatus (10) in response to the inquiry from the checking means (212), storing the information regarding the asset article inputted from the inputting means (23, 241) as emergency new registration data in the emergency new registration database (223).

6. An assets management apparatus having a master database (121) storing information regarding an asset article and connected to a terminal (20) used in stocktaking of the asset article in such a manner that data communication can be performed, the assets management apparatus comprising:

extracting and registering means (111) for extracting the data necessary for the stocktaking from the master database (121) prior to the stocktaking and registering the data as a specified database (221) in the terminal (20), answering means (114) for, when an inquiry from the terminal (20) about whether information regarding an asset article recognized as not existing in the specified database (221) exists in the master database (121) or not is made, answering the result of the retrieval of the information regarding the asset article from the master database (121) to the terminal (20) in response to the inquiry, and reflecting means (115) for updating information regarding an asset article recognized as not existing in the specified database (221) and inputted in the terminal (20) upon the stocktaking on the master database (121)), wherein when an answer to the effect that the information regarding the asset article exists in the master database (121) is given to the terminal (20) by the answering means (114), the reflecting means (115) updates the master database (121) on the basis of emergency registration data obtained by correcting the result of the retrieval as the answer according to the information regarding the asset article inputted in the terminal (20) and stored in an emergency registration database (222), and when an answer to the effect that the information regarding the asset article does not exist in the master database (121) is given to the terminal (20) by the answering means (114), the reflecting means (115) adds emergency new registration data newly inputted as the information regarding the asset article in the terminal (20) and stored in an emergency new registration database (223) to the master database (121).

7. The assets management apparatus according to claim 6, which has a display unit (14) for displaying various kinds of information and a display control unit (116) for controlling the display unit (14), wherein the display control unit (116) controls the display state of the display unit (14) in such a manner that the information regarding the asset article reflected on the master database (121) by the reflecting means (115) is displayed in the display unit (14), before the reflecting means (115) updates the information regarding the asset article on the master database (121).

8. The assets management apparatus according to claim 6 or 7, which has setting means (113) for setting validity or invalidity of an inputting operation of the information regarding the asset article in the terminal (20) prior to the stocktaking.

9. The assets management apparatus according to any one of claims 6 or 7, wherein the extracting and registering means (111) performs condition retrieval according to prescribed conditions, thereby extracting the specified database (221) from the master database (121).

* * * * *